March 21, 1967 P. GREENBERG 3,310,338
TRUCK TARPAULIN ASSEMBLY
Filed Aug. 19, 1965 2 Sheets-Sheet 1
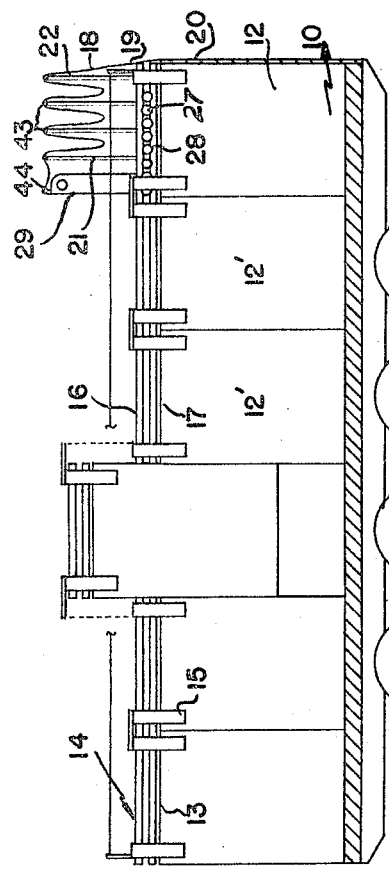
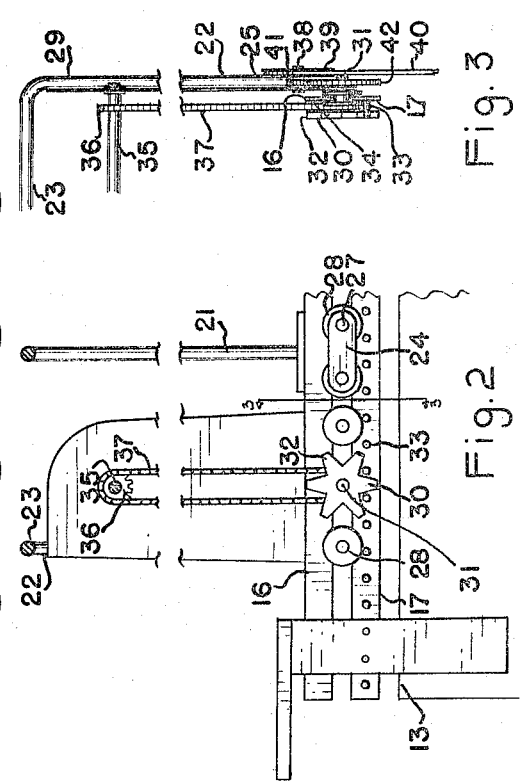
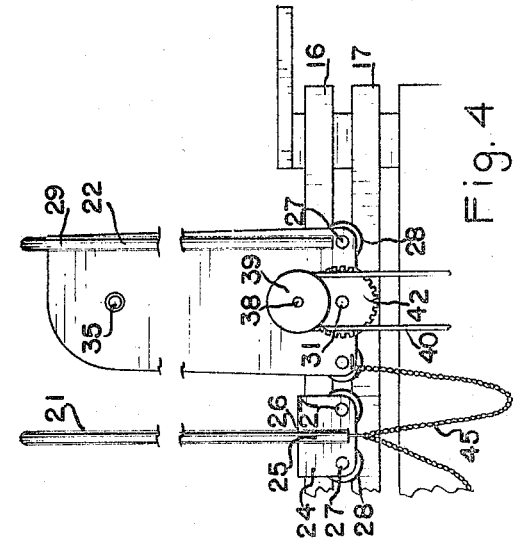
INVENTOR
PERCY GREENBERG
By Featherstonhaugh & Kent
His Atty's.

March 21, 1967 P. GREENBERG 3,310,338
TRUCK TARPAULIN ASSEMBLY
Filed Aug. 19, 1965 2 Sheets-Sheet 2
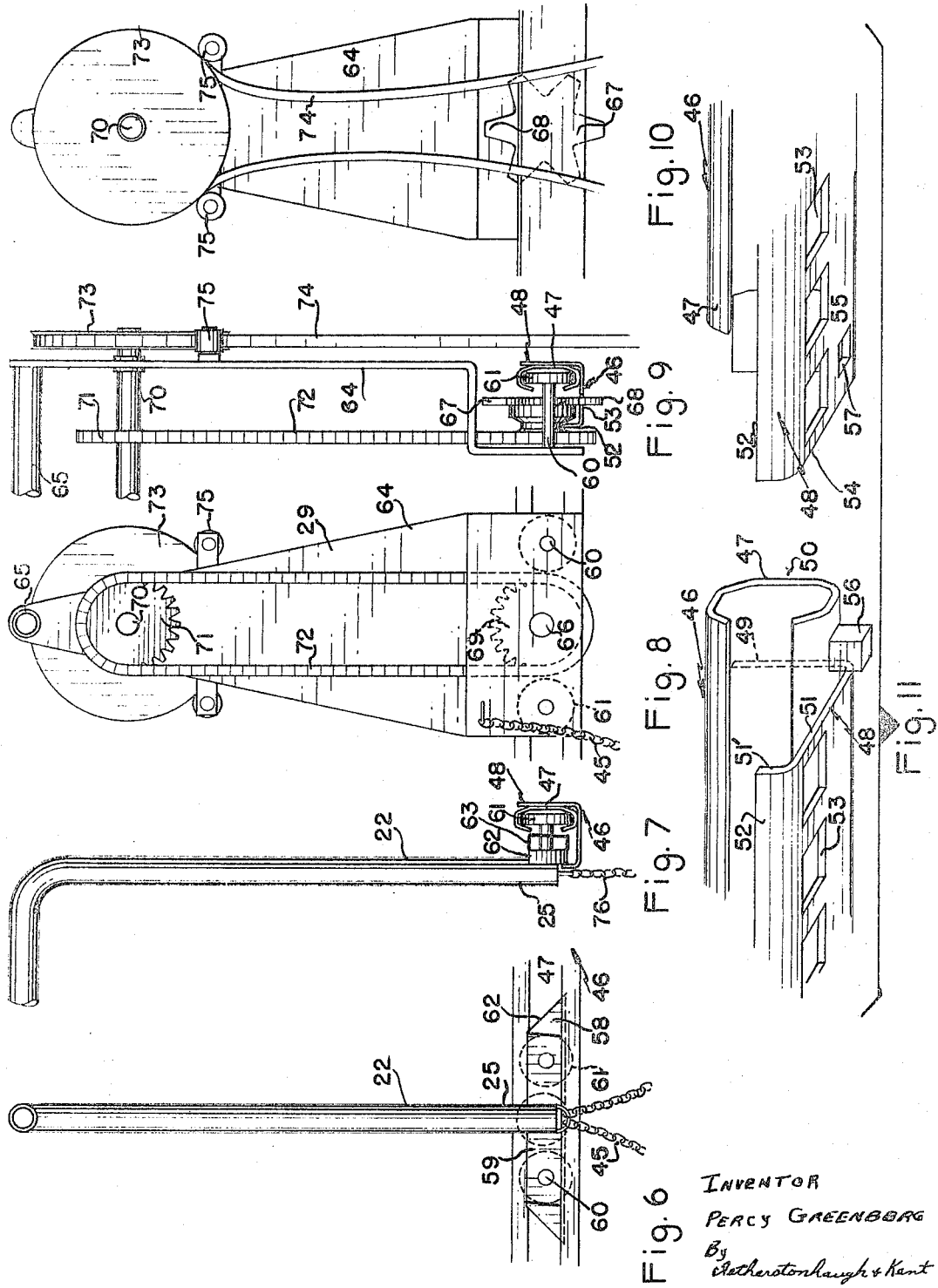
INVENTOR
PERCY GREENBERG
By
Fetherstonhaugh & Kent
His Atty's

United States Patent Office 3,310,338
Patented Mar. 21, 1967

3,310,338
TRUCK TARPAULIN ASSEMBLY
Percy Greenberg, Winnipeg, Manitoba, Canada, assignor to John R. Thomson, Winnipeg, Manitoba, Canada
Filed Aug. 19, 1965, Ser. No. 480,848
11 Claims. (Cl. 296—100)

My invention relates to new and useful improvements in tarpaulin coverings for open truck or trailer bodies, particularly relatively large truck or trailer bodies.

The installation of a tarpaulin covering is conventionally carried out by manhandling the tarpaulin from one length of the truck body to the other over a plurality of fixed hoops.

On relatively large trucks such as semi-trailers, this is an extremely arduous and time consuming operation due to the weight and difficulty in maneuvering a large tarpaulin. The tarpaulin then has to be lashed into position in order to make same secure.

When it is desired to unload the truck or trailer body, the tarpaulin has to be removed, which, once again, is time consuming and arduous.

I have overcome these disadvantages by providing a track upon each side of the truck body, having the tarpaulin hoops mounted for rolling movement along these tracks. The end hoop is provided with a pinion engageable within a rack on the track so that by rotating the pinion, the end hoop moves along the tracks from end of the truck to the other.

The tarpaulin is fixed by one end to the front of the truck body and by the other end to the end hoop so that as the hoop is extended, it pulls the tarpaulin to the extended position. The tarpaulin may either be secured to the intermediate hoops or, alternatively, the intermediate hoops may be interconnected by means of flexible links to the end hoop so that the hoops also are pulled along and extended together with the end hoop.

In uncovering the truck or trailer, the procedure is reversed so that the end hoop pushes the intermediate hoops towards the front end of the truck, the tarpaulin folding between adjacent hoops.

The principal object and essence of my invention is therefore to provide a device of the character herewithin described which facilitates the extending and retracting of the tarpaulin cover on open truck bodies.

Another object of the invention is to provide a device of the character herewithin described in which the tarpaulin and hoops, when in the retracted position, take up relatively little room.

Another object of the invention is to provide a device of the character herewithin described which enables a single operator to extend or retract the tarpaulin with very little time and effort.

Yet another object of the invention is to provide a device of the character herewithin described which can readily be installed upon any open type truck or trailer.

A still further object of the invention is to provide a device of the character herewithin described which permits the conventional removable sections of truck sides to still be removed to facilitate loading and unloading.

A yet further object of the invention is to provide a device of the character herewithin described which permits partial covering of the load by partially extending the tarpaulin.

A yet further object of the invention is to provide a device of the character herewithin described which is simple in construction, economical in manufacture, and otherwise well suited to the purpose for which it is designed.

With the foregoing in view, and all those objects, purposes or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIGURE 1 is a side elevation of a truck showing my device incorporated therein.

FIGURE 2 is an enlarged fragmentary side elevation showing the end hoop and the next adjacent hoop.

FIGURE 3 is a view substantially along the line 3—3 of FIGURE 2.

FIGURE 4 is a view similar to FIGURE 2 but taken upon the opposite side of the truck and showing the operating mechanism.

FIGURE 5 shows one mehod of attaching the tarpaulin hoops to the truck roller carriages.

FIGURE 6 is a fragmentary view of one of the roller carriages and one of the tarpaulin hoops, this being the preferred embodiment of my invention.

FIGURE 7 is an end view of FIGURE 6.

FIGURE 8 is a view similar to FIGURE 6 but showing the end hoop assembly with the drive means.

FIGURE 9 is an end view of FIGURE 8.

FIGURE 10 is a view similar to FIGURE 8 but reversed.

FIGURE 11 is a fragmentary isometric view of adjacent ends of my novel track assembly showing the method of connecting same.

In the drawings like characters of reference indicate corresponding parts in the different figures.

Proceeding therefore to describe the embodiment of the invention shown in FIGURES 1 to 5 inclusive, 10 illustrates generally the side view of an open truck or trailer mounted upon wheels 11 and having sides 12. These sides are usually manufactured in a plurality of sections 12' so that they may be detached to facilitate loading and unloading of the truck body.

Secured parallel to the upper edge 13 of the truck body side 12 is a track assembly collectively designated 14 supported upon vertical straps 15 which are bolted to the truck sides.

The track assembly is in sections so that the sections 12' can be removed and the track assembly comprises an upper rail 16 and a lower rail 17 situated in spaced and parallel relationship with one another.

The tarpaulin 18 is secured by one end 19 thereof to the front end 20 of the truck and is supported above the truck body by a plurality of tarpaulin hoops 21 which overspan the truck body and include vertical side members 22 and horizontal upper member 23.

These tarpaulin hoops are supported for rolling movement along the track assembly 16 by means of a roller carriage 24 secured to the lower ends 25 of the sides 22. These carriages comprise a plate 26 to which the aforementioned lower ends 25 are secured, said plate carrying a pair of roller pins 27 one forwardly and one rearwardly of the attachment of the hoop 21. Spool type rollers 28 are journalled upon pins 27 and engage between the upper and lower rails 16 and 17 as clearly shown in FIGURES 2, 3, and 4.

The end hoop specifically designated 29 supplies the manual drive for the asembly and is also mounted between the upper and lower rails by means of rollers 28 mounted upon pins 27 as hereinbefore described.

A pinion 30 is journalled upon a pinion pin 31 and the teeth 32 of this pinion engage between offstanding pins 33 secured to the lower rail 17 in spaced relationship as shown in FIG. 2, so that rotation of this pinion 30 will cause the end tarpaulin hoop 29 to move along the track assemblies.

It is, of course, necessary to transfer the drive from one side to the other of the truck and in this connection I have provided a sprocket 34 secured to each of the pinion pins or spindles 31. A cross shaft 35 extends across the end hoop 29 and is journalled for rotation, said cross shaft having sprockets 36 secured thereto, one above each of the aforementioned sprockets 34.

Chains 37 extend around upper and lower sprockets 34 and 36 so that rotation of one portion of the drive assembly will give equal rotation to the other side.

FIGURES 3 and 4 show the method I utilize to obtain this rotation. A shaft 38 is journalled for rotation to one side of the roller carriage of the end hoop 29 and a belt pulley 39 is secured to this shaft. A loose belt 40 extends around this belt pulley so that by pulling upon the belt, the belt pulley is rotated. Also affixed to shaft 38 is a sprocket 41 engageable with a gear 42 which in turn is secured to the aforementioned spindle 31 mounting the pinion 30. By pulling on the belt 40, the pinions on both sides of the assembly are rotated equally.

In the embodiment shown in FIGURES 1 to 4, I provide means for operatively connecting the tarpaulin to the hoops 22, said means comprising the securing of the tarpaulin to the hoops as indicated at 43 in FIGURE 1, it being understood that the end 44 of the tarpaulin is secured to the end hoop 29. Therefore when the end hoop is extended along the tracks, the tarpaulin is extended also and pulls the hoops along the tracks.

FIGURE 4 shows flexible links 45 extending between adjacent roller carriages so that as each roller carriage is extended by the end hoop 29, it pulls the next adjacent carriage along with it.

FIGURES 6 to 11 inclusive shows a preferred embodiment of the track assembly and rack and pinion assembly.

The track assembly collectively designated 46 is bolted to adjacent the upper edges of the truck sides 12' and are situated parallel to the upper edges of these sides.

The track assembly comprises a substantially C-shaped cross section wheel engaging portion 47 and a rack portion collectively designated 48 secured thereto.

The rack portion includes the vertical portion 49 which is welded to the rear side 50 of the wheel section 47 and a substantially planar offstanding portion 51 extending beyond the wheel portion 47 and terminating in a slightly upturned outer edge 52.

This portion 51 is provided with a plurality of apertures 53 along the length thereof, said apertures being equally spaced along this portion.

Means are provided to permit adjacent sections of the truck sides to be removed or replaced together with the portion of the track secured thereto and FIGURE 11 shows the method of interconnecting adjacent ends of the track to provide alignment of the adjacent sections.

One end of each track section is provided with the C-shaped portion 47 extending beyond the end 51' of the rack section as shown in left-hand side of FIGURE 11.

In forming the opposite end of each section, the C-shaped portion 47 terminates spaced from the extremity 54 of the rack section thus giving an extended end portion 55 to this rack section as shown in the right-hand side of FIGURE 11.

A pin 56 is provided upon the extending end 50 of the C-shaped portion and a corresponding aperture 57 is provided in the extended portion 55 of the rack section. The two ends of adjacent track sections nest one within the other with the pin 56 of one section engaging the aperture 57 of the other, thus locking the track sections together and preserving the alignment of the track sections.

The tarpaulin hoops 22 of this embodiment are provided at the lower ends 25 thereof with a wheel or roller carriage 58 comprising a plate 59 which is secured centrally to the end 25 of the tarpaulin hoop. Wheel or roller pins 60 extend from this plate, one forwardly and one rearwardly of the hoop end 25 and rollers or wheels 61 are journalled for rotation upon these pins. These rollers or wheels are adapted to engage within the C-shaped track 47 as shown in FIGURES 7 and 9, the shaping of the track retaining the wheels against sideways movement.

In this connection reference should be made to FIGURES 6 and 7 which shows that the ends 62 of the plate 59 incline downwardly and outwardly and are provided with a double thickness or additional portion 63 welded thereto. The purpose of this double thickness inclined end is to prevent the tarpaulin from being jammed by the wheels or rollers 61 as they move along the track. The inclined portions move any loose tarpaulin out of the way of the wheels or rollers as they move along the track.

The end hoop 29 in this embodiment supplies the manual motive power to the assembly and comprises a pair of side plates 64 together with the upper transverse portion 65 to which one end of the tarpaulin is secured.

The plate mounts the rollers 61 within the track 47 and also is provided with a shaft or pin 66 between the rollers 61 upon which the pinion 67 is secured. The teeth 68 of this pinion engage the apertures 53 of the rack portion 48 shown in FIGURES 9 and 11.

Also upon shaft 66 is a sprocket wheel 69 and adjacent the upper ends of the side plate 64 is a transverse shaft 70 carrying corresponding sprocket wheels 71 thereon. Chains 72 extend around upper and lower sprocket wheels thus connecting the drive from one side of this hoop to the other.

Also secured to shaft 70 is a pulley 73 around which a loose belt 74 extends, being maintained in engagement with the pulley groove by means of belt retainers 75 secured to the plate 64.

Therefore it will be appreciated that by pulling upon the belt 74, the pulley 73 is rotated one way or the other thus extending the end hoop 29 or retracing same, along the track assemblies.

In the preferred embodiment I have found it desirable to only attach the tarpaulin to the end hoop 29. However, it is of course necessary to interconnect the hoops together and in this connection flexible chains 76 extend between the lower ends 25 of adjacent hoops so that as each hoop is extended, it pulls the next adjacent hoop therealong.

The tarpaulin is of course extended by the movement of the end hoop 29 along the tracks.

It will be appreciated that the operator merely pulls on the loose belt 74 and walks along the side of the truck as the end hoop moves along the track assemblies.

Since various modifications can be made to the invention herein described within the scope of the inventive concept disclosed, it is not intended that protection of the said invention should be interpreted as restricted to the modification or modifications or known parts of such concept as have been particularly described, defined, or exemplified, since this disclosure is intended to explain the construction and operation of such concept, and not for the purpose of limiting protection to any specific embodiment or details thereof.

What I claim as my invention is:

1. A truck tarpaulin assembly for open trucks, trailers and the like which include a pair of spaced and parallel body sides; comprising in combination a track assembly secured to each body side adjacent the upper edge thereof and parallel therewith, a plurality of tarpaulin hoops overspanning said body sides and means mounting said tarpaulin hoops for rolling movement along said track assemblies, a tarpaulin secured by one end thereof to one end of said truck body and being supported by said tarpaulin hoops, the other end of said tarpaulin being secured to the end tarpaulin hook remote from said one end of said truck body, rack means on each of said track assemblies, and pinion means on each side of said end tarpaulin hoop engageable each with said corresponding rack member, means on said end tarpaulin hoop for rotating said pinion means, and means operatively connecting said tarpaulin to said hoops whereby when said end hoop moves along said track assembly, it extends and retracts said other tarpaulin hoops and said tarpaulin.

2. The device according to claim 1 in which said track assembly includes an upper and lower rail in spaced and parallel relationship, said means mounting said tarpaulin hoops for rolling movement including a roller carriage at the lower end of each side of the each of said tarpaulin hoops, at least two rollers journalled for rotation within said roller carriage and engageable between said upper and lower rails, said rack means including a plurality of spaced and parallel rack pins secured to and extending at right angles from one of said rails, said pinion engaging said rack pins.

3. The device according to claim 2 in which said means on said end hoop for rotating said pinion means includes a spindle mounting each of said pinions to said corresponding roller carriage, a sprocket secured to each of said spindles, a cross shaft journalled for rotation across said end tarpaulin hoop adjacent the upper side thereof, a sprocket secured to said cross shaft adjacent each end thereof and above said first mentioned sprockets, chains extending around each upper and lower sprockets, and means on one of said roller carriages for rotating said chain and sprockets and hence said pinions.

4. The device according to claim 1 in which said track assembly includes a wheel engaging substantially cross sectionally C-shaped portion and a substantially planar offstanding multi-apertured rack portion secured thereto, said means mounting said tarpaulin hoops for rolling movement therealong including a roller carriage secured to the lower end of each side of said tarpaulin hoop, at least two roller mounting pins, one forwardly and one rearwardly of said tarpaulin hoop lower end, and secured to said roller carriage, a roller journalled for rotation upon each of said pins, said roller being engageable within said cross sectionally C-shaped portion of said track assembly, the apertures in said rack portion being engageable by the teeth of said pinions.

5. The device according to claim 4 in which said means on said end hoop for rotating said pinion means includes a spindle mounting each of said pinions to said corresponding roller carriage, a sprocket secured to each of said spindles, a cross shaft journalled for rotation across said end tarpaulin hoop adjacent the upper side thereof, a sprocket secured to said cross shaft adjacent each end thereof and above said first mentioned sprockets, chains extending around each upper and lower sprockets, and means on said cross shaft to rotate same and hence said pinions.

6. The device according to claim 4 in which said truck sides comprise a plurality of detachable sections, a section of said track assembly being secured to each of said detachable portions, means detachably interconnecting adjacent ends of said track assembly, said last mentioned means comprising one end of said cross sectionally C-shaped portion extending beyond said rack portion, the other end of said cross sectionally C-shaped portion terminating spaced from said rack portion thereby providing an extended end of said rack portion, a pin extending downwardly from said one end and an aperture in said extended end of said rack portion, said pin of one adjacent section engaging said aperture in the next adjacent section thereby aligning said track sections.

7. The device according to claim 5 in which said truck sides comprise a plurality of detachable sections, a section of said track assembly being secured to each of said detachable portions, means detachably interconnecting adjacent ends of said track assembly, said last mentioned means comprising one end of said cross sectionally C-shaped portion extending beyond said rack portion, the other end of said cross sectionally C-shaped portion terminating spaced from said rack portion thereby providing an extended end of said rack portion, a pin extending downwardly from said one end and an aperture in said extended end of said rack portion, said pin of one adjacent section engaging said aperture in the next adjacent section thereby aligning said track sections.

8. The device according to claim 4 in which said means operatively connecting said tarpaulin to said hoops includes a plurality of flexible elements extending between adjacent hoops adjacent the lower ends thereof and secured to said hoops, thereby extending and retracting said hoops when said end hoop is extended and retracted, the length of said flexible elements determining the positioning of said hoops along said track when said hoops are fully extended.

9. The device according to claim 5 in which said means operatively connecting said tarpaulin to said hoops includes a plurality of flexible elements extending between adjacent hoops adjacent the lower ends thereof and secured to said hoops, thereby extending and retracting said hoops when said end hoop is extended and retracted, the length of said flexible elements determining the positioning of said hoops along said track when said hoops are fully extended.

10. The device according to claim 6 in which said means operatively connecting said tarpaulin to said hoops includes a plurality of flexible elements extending between adjacent hoops by extending and retracting said hoops when said end hoop is extended and retracted, the length of said flexible elements determining the positioning of said hoops along said track when said hoops are fully extended.

11. The device according to claim 7 in which said means operatively connecting said tarpaulin to said hoops includes a plurality of flexible elements extending between adjacent hoops by extending and retracting said hoops when said end hoop is extended and retracted, the length of said flexible elements determining the positioning of said hoops along said track when said hoops are fully extended.

References Cited by the Examiner

UNITED STATES PATENTS

| | | | |
|---|---|---|---|
| 1,602,017 | 10/1926 | Hamilton | 296—105 |
| 1,713,923 | 5/1929 | Schlicher | 296—105 |
| 2,469,958 | 5/1949 | Fowler | 296—105 |
| 2,889,171 | 6/1959 | Morris | 296—100 |
| 3,041,104 | 6/1962 | Richard | 296—100 |

FOREIGN PATENTS 95,116    7/1959    Denmark.

BENJAMIN HERSH, *Primary Examiner.*

C. C. PARSONS, *Assistant Examiner.*